(12) United States Patent
Clark et al.

(10) Patent No.: US 7,080,592 B2
(45) Date of Patent: Jul. 25, 2006

(54) ROTATING CYLINDER

(75) Inventors: Phillip D. Clark, Kokomo, IN (US); Alan Claxton, Walton, IN (US); David Claxton, Logansport, IN (US); Thomas Thompson, Logansport, IN (US); Gregory A. Stephens, Russiaville, IN (US)

(73) Assignee: Stephens Dynamics, Inc., Kokomo, IN (US)

( * ) Notice: Subject to any disclaimer, the term of this patent is extended or adjusted under 35 U.S.C. 154(b) by 0 days.

(21) Appl. No.: 11/030,447

(22) Filed: Jan. 6, 2005

(65) Prior Publication Data

US 2005/0150373 A1    Jul. 14, 2005

Related U.S. Application Data

(60) Provisional application No. 60/535,116, filed on Jan. 8, 2004.

(51) Int. Cl.
*F15B 11/08*    (2006.01)

(52) U.S. Cl. ........................................... 92/106
(58) Field of Classification Search .................. 92/106; 279/4.01

See application file for complete search history.

(56) References Cited

U.S. PATENT DOCUMENTS

| | | | |
|---|---|---|---|
| 2,577,858 A * | 12/1951 | Sampson | 92/106 |
| 4,493,242 A | 1/1985 | Rohm | |
| 4,621,568 A | 11/1986 | Gailey | |
| 4,669,362 A * | 6/1987 | Nobukawa et al. | 92/106 |
| 4,945,819 A | 8/1990 | Rohm | |
| 4,996,908 A | 3/1991 | Thompson | |
| 4,999,002 A | 3/1991 | Fink | |
| 6,220,143 B1 * | 4/2001 | Yoshida | 92/106 |
| 6,257,122 B1 | 7/2001 | Michler | |
| 6,581,509 B1 * | 6/2003 | Clark et al. | 92/106 |

* cited by examiner

*Primary Examiner*—Thomas E. Lazo
(74) *Attorney, Agent, or Firm*—Frank D. Lachenmaier

(57) ABSTRACT

In accordance with the present invention a pneumatic or hydraulic rotating cylinder capable of very high speeds is embodied. It is constructed of light weight materials, minimizing the mass but is given the ability to run at high speed in spite of vibrating environments, supply line condensation, contaminants and various attitudinal mounting by the anti-seizure insert bearing inserted into the distributor and sleeving the rotating shaft.

4 Claims, 3 Drawing Sheets

ROTATING CYLINDER

CROSS-REFERENCE TO RELATED APPLICATION

This application claims the benefit of Provisional Patent Application Ser. No. 60/535,116 filed Jan. 8, 2004.

BACKGROUND

1. Field of Invention

This invention relates generally to pneumatic & hydraulic rotating cylinder apparatus and an improved method of manufacture of same. More specifically, this invention relates to high speed rotating cylinders with a broad range of applications that can operate in hostile environments virtually free from seizures.

2. Prior Art

A variety of high speed rotating cylinders exist and are used on many different type of machine tools as clamps that turn with the work piece. To achieve high speed operation many complex and costly systems have been produced. Most, due to very tightly toleranced clearances, can not allow any condensation or contaminants in their supply lines thus requiring precision filtering (5 micron required on air or hydraulic fluid supply) and high maintenance costs. Some, such as U.S. Pat. No. 6,257,122—Clamping cylinder—Michler (Heinz Dieter Schunk GMBH) 2001 and U.S. Pat. No. 4,621,568—Rotary hydraulic cylinder—Gailey (SP Manufacturing Corp.) 1986, have utilized expensive and time consuming coatings such as an aluminum oxide hard coating that is Teflon impregnated, or high purity hard surface chrome plating, trying to avoid the typical wear to aluminum cases and the inevitable seizures that follow.

SUMMARY

An object of the present invention is to provide a pneumatic or a hydraulic rotating cylinder capable of high speeds (7000 rpms) mountable at any attitude, that virtually eliminates seizures that cause costly downtime and machine damage. Another objective is to provide a pneumatic or hydraulic rotating cylinder capable of high speeds that does not require exceptional filtering of the input lines caused by exceptionally tightly toleranced assembly clearances. A third objective is to provide a pneumatic or hydraulic rotating cylinder that does not require expensive, time-consuming hard surface anti-friction coatings on the moving parts. A fourth objective is to provide a pneumatic or hydraulic rotating cylinder with sufficient improved reliability to allow a doubling of existing warranty periods.

All four of these objectives are met by inserting a cylindrical anti-seizure bearing sleeve made from a light weight wear resistant material as shown in the accompanying drawings.

DRAWINGS

In order that the invention may be more fully understood it will now be described by way of example, with reference to the accompanying drawings in which.

REFERENCE NUMERALS

The same reference numbers are used to refer to the same or similar parts in the various views.

| | |
|---|---|
| 10 | Standard Distributor Assembly |
| 12 | Distributor Assembly with Press Fit Anti-seizure Bearing Insert. |
| 14 | Distributor Assembly with O-ring Sealed Anti-seizure Bearing Insert |
| 16 | O-ring seals |
| 18 | anti-seizure bearing insert |
| 20 | bearings |
| 22 | distributor cap seals |
| 24 | distributor |
| 26 | ports for fluid supply |
| 28 | steel shaft |
| 30 | anti-seizure bearing insert with O-ring seal clearances |
| 32 | cap |

DESCRIPTION

Figure 1:
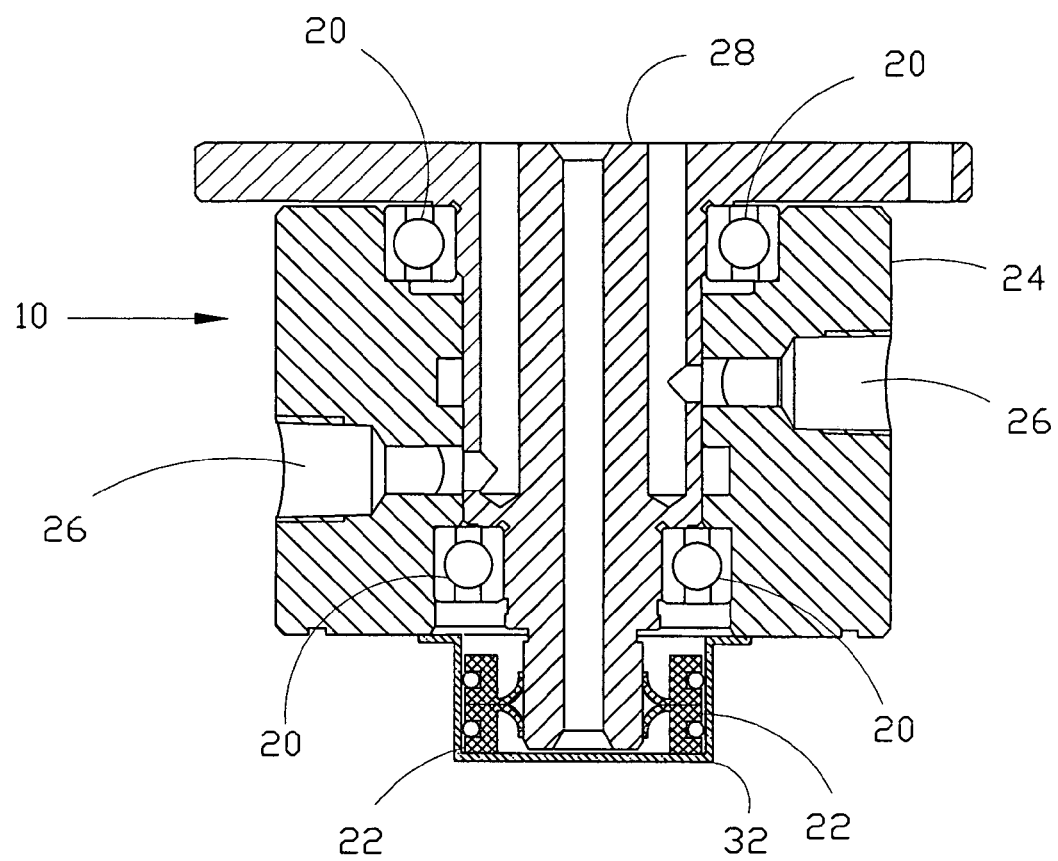
FIG. 1 is a cross-section view of a Prior Art Standard Distributor Assembly.

In order that the invention may be more fully understood, it will now be described by way of example with reference to the accompanying drawings in which FIG. 1 illustrates standard pneumatic or hydraulic distributor assemblies 10 on cylinders. Steel shaft 28 turns in aluminum or steel distributor 24. Shaft seals 22 are fitted into the end cap 32 and wipe against the small diameter of shaft 28. Bearings 20 ride between the third and fifth outside diameters of shaft 28 and mating diameters of housing 24. Pluralities of ports for fluid supply 26 are bored though the walls of said distributor and outer wall of said anti-seizure insert into concentric channels machined into the inside diameter of said anti-seizure bearing insert as required for specific applications and axial bores are made parallel to the axis of said shaft with cross bores at the levels of said concentric channels connecting said axial shaft bores to said circumferential insert channels allowing for the exit of said fluid supply.

Figure 2:
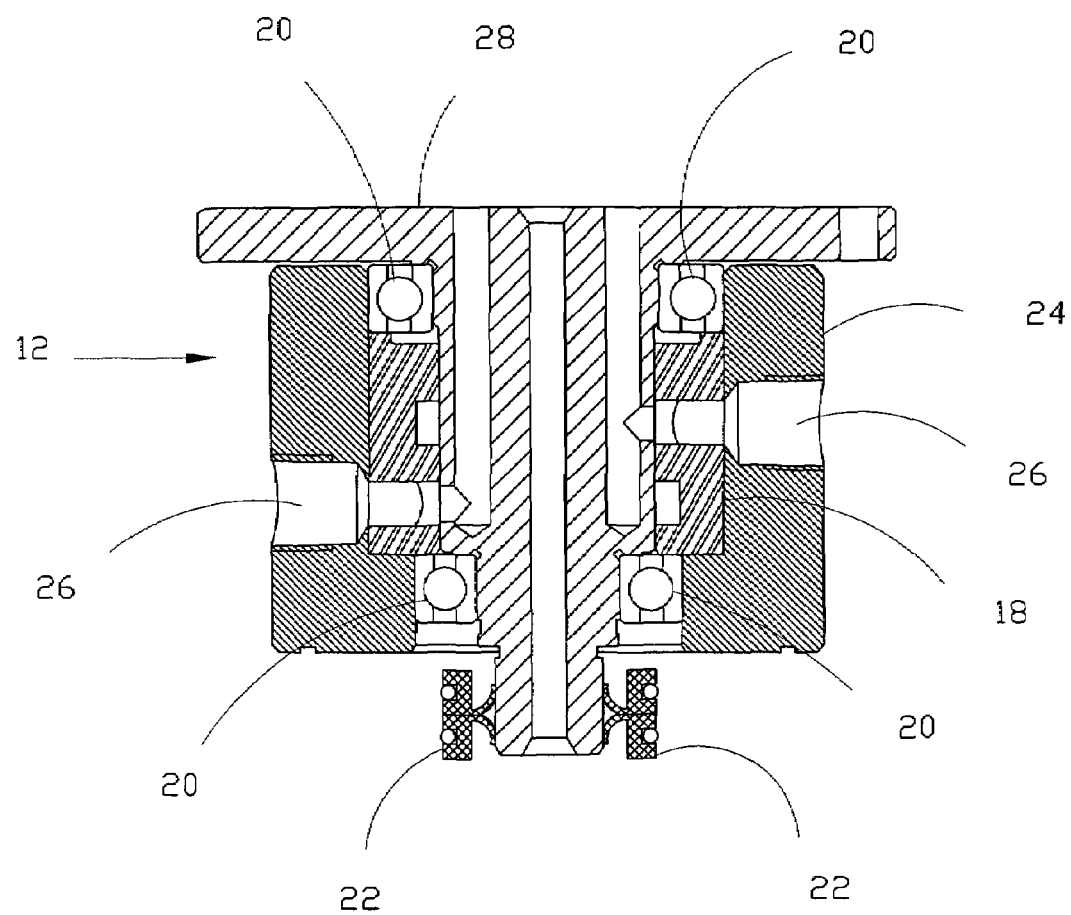
FIG. 2 is a cross-section view of the improved Distributor Assembly disclosing the press fit anti-seizure bearing insert.

The improvement in the construction is shown in Distributor Assembly with Press Fit Anti-seizure Bearing Insert 12 in FIG. 2 and involves press fitting anti-seizure bearing insert 18 into a machined race way in housing 24. Insert 18 is a cylindrical sleeve with fluid distribution channels machined into its inside diameter, made from wear resistant material such as GAROLITE—Phenolic Thermoset Laminate from GE Polymershapes at 1019 Capital Avenue, Indianapolis, Ind. Standard machining tolerances for the outside diameter of shaft 28 and the inside diameter of insert 18 are sufficient to provide an operating clearance. This method of manufacture provides a dramatically lower cost solution to a long-standing problem.

Experiments show an improvement in durability of the present invention versus the industry standard approach of a steel rod or piston and an aluminum cylinder. The increased in durability has allowed doubling of industry standard warranties from the improvement of the rotary cylinder design with the inserted bearing surface of a particular wear resistant material and attest to the uniqueness of the invention.

Figure 3:
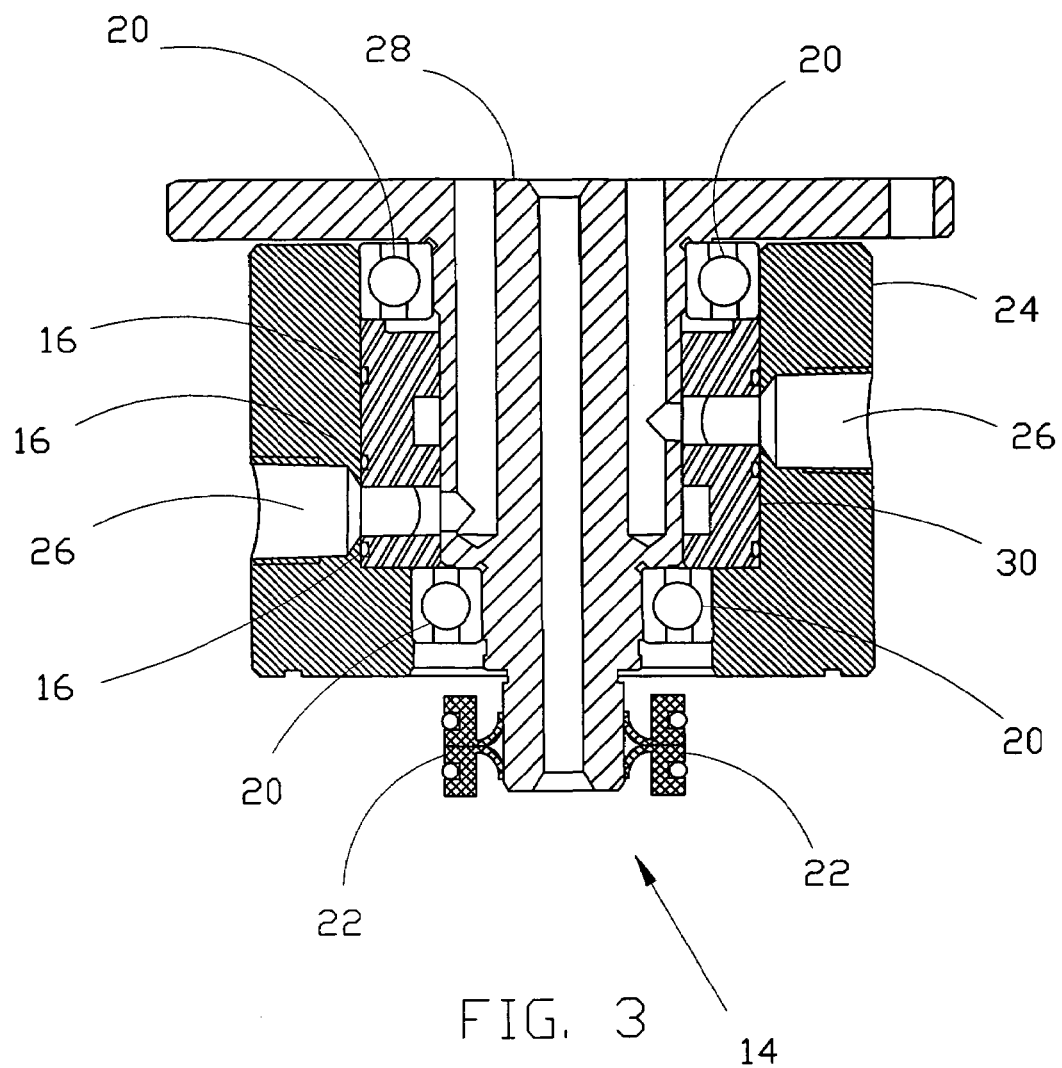
FIG. 3 is a cross-section view of the improved Distributor Assembly disclosing the O-ring sealed anti-seizure bearing insert.

A second construction embodies the use of anti-seizure bearing insert 30 of wear resistant material such as GARO- LITE—Phenolic Thermoset Laminate from GE Polymershapes at 1019 Capital Avenue, Indianapolis, Ind. Its improvement is illustrated in Distributor Assembly with O-ring Sealed Anti-seizure Bearing Insert 14 in FIG. 3 and is the addition of circumferential grooves on the outside surface of insert 30 with O-ring seals 16 between mating outside diameter surfaces of anti-seizure bearing insert 30 and the inside diameter of distributor 24. This embodiment allows an even further improvement in downtime costs when, in the rare occurrence of a seizure, O-ring seals 16 allow insert 30 to rotate within distributor 24, instead of destroying the accompanying attachments.

Operation:

The use of anti-seizure bearing inserts 18 or 30 dramatically increase the life of the high-speed, rotating cylinder by eliminating wear related seizures, allowing for a doubling of existing warranties. It also does not require the extremely tight clearances of prior art Distributor Assemblies 10, thus reducing the filtration required on the fluid supply lines. The extra bearing support provided by the anti-seizure inserts 18 and 30 also allows the cylinder to rotate at high speed (7000 revolutions per minute) at other than horizontal attitudes. It also allows the components to remain low mass and inertia further facilitating high speed operations.

Distributor Assembly with O-ring Sealed Anti-seizure Insert 14 includes three elastomeric O-rings 16 in circumferential grooves in the outside surface of insert 30, holding insert 30 frictionally in place within housing 24. They allow insert 30 to turn within distributor 24 if in some extreme circumstance a seizure was to occur or the torque between shaft 28 and insert 30 were to exceed some maximum amount, preventing further damage to the system.

The preceding descriptions are for illustrative purposes and are not intended to limit the scope of this invention. One skilled in these fabrication arts will see many options for material thickness, masses, material selections that fit within the scope of this invention. The scope of the invention should be determined by the appended claims rather than by the specific examples given.

The invention claimed is:

1. A rotating high-speed, 7000 revolutions per minute, pneumatic clamping cylinder comprising:
    a distributor of cylindrical shape made from a light weight metal;
    a clamping piston shaft made from steel, rotating within said distributor;
    bearings operating between third and fifth diameters of said shaft and mating
    diameters on the internal diameter of said distributor;
    an anti-seizure bearing insert made from a wear resistant material such as a press fit into a machined race in the internal diameter of said distributor;
    elastomeric shaft seals are filled into an end cap, and wipe against the small diameter of shaft 28; and
    pluralities of ports for fluid supply are bored though the walls of said distributor and outer wall of said anti-seizure insert into concentric channels machined into the inside diameter of said anti-seizure bearing insert and axial bores are made parallel to the axis of said shaft with cross bores at the levels of said concentric channels connecting said axial shaft bores to said circumferential insert channels allowing for the exit of said fluid supply,
    whereby wear related seizures are virtually eliminated and the clamping system can be arranged in any attitude allowing the doubling of industry standard warranties.

2. A rotating high-speed, pneumatic clamping cylinder according to claim 1 wherein the anti-seizure bearing insert made from a wear resistant material has circumferential O-ring retaining grooves on its outer diameter and elastomeric O-rings are inserted between said grooves and the internal diameter of said distributor, whereby, in the unlikely event of a seizure or an increase in the torque applied by said shaft to said insert above some predetermined level, said insert is freed to turn with respect to said distributor, thus not damaging any external components.

3. A rotating high-speed, 7000 revolutions per minute, hydraulic clamping cylinder comprising:
    a distributor of cylindrical shape made from a light weight metal;
    a clamping piston shaft made from steel, rotating within said distributor;
    bearings operating between third and fifth diameters of said shaft and mating
    diameters on the internal diameter of said distributor;
    an anti-seizure bearing insert made from a wear resistant material press fit into a machined race in the internal diameter of said distributor;
    elastomeric shaft seals are fitted into an end cap, and wipe against the small diameter of shaft 28; and
    pluralities of ports for fluid supply are bored though the walls of said distributor and outer wall of said anti-seizure insert into concentric channels machined into the inside diameter of said anti-seizure bearing insert and axial bores are made parallel to the axis of said shaft with cross bores at the levels of said concentric channels connecting said axial shaft bores to said circumferential insert channels allowing for the exit of said fluid supply,
    whereby wear related seizures are virtually eliminated and the clamping system can be arranged in any attitude allowing the doubling of industry standard warranties.

4. A rotating high-speed, hydraulic clamping cylinder according to claim 3 wherein the anti-seizure bearing insert made from a wear resistant material has circumferential O-ring retaining grooves on its outer diameter and elastomeric O-rings are inserted between said grooves and the internal diameter of said distributor, whereby, in the unlikely event of a seizure or an increase in the torque applied by said shaft to said insert above some predetermined level, said insert is freed to turn with respect to said distributor, thus not damaging any external components.

* * * * *